United States Patent [19]

Mistry

[11] Patent Number: 5,308,292
[45] Date of Patent: May 3, 1994

[54] CABLE CHAIN

[75] Inventor: Anil Mistry, Letchworth, England

[73] Assignee: Xerox Corporation, Stamford, Conn.

[21] Appl. No.: 45,441

[22] Filed: Apr. 8, 1993

[30] Foreign Application Priority Data

Apr. 13, 1992 [GB] United Kingdom ............... 9208109

[51] Int. Cl.$^5$ ............................................. F16G 13/00
[52] U.S. Cl. .................................. 474/207; 59/84; 474/253
[58] Field of Search ............ 474/206, 231, 207, 232, 474/212, 233, 253, 255, 257, 258; 59/78, 84, 4, 5

[56] References Cited

U.S. PATENT DOCUMENTS

| | | | |
|---|---|---|---|
| 3,847,031 | 11/1974 | Araya | 74/258 |
| 3,885,445 | 5/1975 | Montano | 474/231 X |
| 4,060,006 | 11/1977 | Abel et al. | 74/258 |
| 4,932,927 | 6/1990 | Fillar | 474/207 |

FOREIGN PATENT DOCUMENTS 703751 2/1954 United Kingdom ................ 80/1

*Primary Examiner*—Thuy M. Bui

[57] ABSTRACT

A plastic cable chain having two free ends comprises at least two metallic cables jacketed in a plastic material and spaced apart by cross-linked spacer members. Each of the cables have opposing free ends with a respective eyelet for facilitating the coupling of the eyelets on opposing cable free ends. The eyelets are connected by a connecting link to define thereby a continuous substantially plastic cable chain. In a preferred embodiment, the eyelets are formed by the free end of the cable being bent over and joined to another part of the cable to form a closed loop. The invention also relates to a method of manufacturing a length of the plastic cable as well as to a method of coupling the ends of the plastic cable together to make a continuous chain.

13 Claims, 1 Drawing Sheet

CABLE CHAIN

BACKGROUND OF THE INVENTION

The present invention relates to a cable chain and more particularly to a plastic cable chain. The invention also relates to a method of manufacturing a length of cable chain and to a method of coupling the ends of the chain to make the chain continuous.

The use of plastic cable chain as a "silent drive" for office machines, such as duplicators or copiers, is well known. The main problem encountered in the use of plastic cable chain with such machines is its high incidence of failure due to breakage. The breakages occur at the weakest point of the chain which is that part at which, during manufacture, the exposed cable ends of the chain have been coupled together to make the chain continuous. One manufacturing method is to weld the free ends of the metal cable together but, although a wide variety of welding techniques have been tried, they have been found to introduce weaknesses in the welded metal leading to brittle and fatigue failures during use.

An alternative technique that has been employed is to crimp a steel bush 2 over the exposed metal ends 14, 16 of the cables as shown in FIG. 1. This method has the added advantage that the forming of the chain into a continuous length can be performed in situ thereby reducing manufacturing costs. This method however has been found to have disadvantages in that the service engineer requires special hand tools and must be extremely careful in using these tools to avoid weakening the cable. The first step involves the service engineer cutting the plastic jacket 18 (one pitch each side) lightly with a sharp razor blade all around and carefully stripping or twisting off the jacket 18 to expose the ends 14, 16 of the stainless steel cables. Extreme care must be taken at this stage to ensure no cutting or fraying of the cables which can be of very small diameter, 1 mm or less. The service engineer must then carefully slide the stripped cable into the oval splice bushing 2 having a chamfered end. Again the service engineer must take extreme care not to fray the cable and must also ensure that he feeds the cable into the chamfered end last. The bushing 2 must then be accurately centered ensuring that the chain is straight before a crimp tool is positioned over the bushing 2 and squeezed tightly for maximum splice strength. It has also been found that the failure rate of plastic cable chains having their ends crimped in this manner is undersirably high. There is a need therefore to find a means of facilitating the task of the service engineer whilst also providing a design of cable chain with a longer operational life. It is an object of the present invention to meet that need.

U.K. Patent No. 703,751 to British Ropes, Ltd. and R. Elkington, discloses belts having a plurality of belt reinforcing members embedded therein such as wire, cord, and cable extending longitudinally off the belts. In joining the ends of the belt, it is essential that the opposing ends of the reinforcing members be aligned at the meeting ends of the belt and that the reinforcing members be joined together without weakening the belt or impairing its flexibility. This is accomplished by placement of a socketed cylindrical shank having on its outer end a ring-like eyelug on each reinforcing member end. The axis of eyelug orifice is perpendicular to the axis of the shanks. The ends of the reinforcing members are inserted into the shank socket and swaged thereto. The eyelugs of each reinforcing member on opposite ends of the belt are interdigitated, so that their orifices are coaxial, thereby permitting the insertion of a flexible hinge pin therethrough, the opposite ends of which are screw-threaded and fitted with washers and retaining nuts.

U.S. Pat. No. 3,847,031 to Araya discloses a connecting link for a roller chain that includes a pair of link plates, one of the plates having integrally secured thereto a pair of connecting pins, so that the pins are cantilevered therefrom. The other link plate is installed over the distal ends of the connecting pins and a resilient locking member is placed on the distal ends of the connecting pins outwardly of the link plate.

U.S. Pat. No. 4,060,006 to Abel et al. discloses a plastic ladder chain made continuous by affixing the exposed metallic cable ends to a master coupling link of stainless steel. The cable ends of the confronting ladder chain ends are fastened to a respective one of two identical, separate links and then the separate links are connected together by a master cross link having apertures therein to receive the outer ends of the separate links. Retainer clips hold the master cross links in place by engaging annular grooves on the opposite ends of the master cross links.

SUMMARY OF THE INVENTION

Accordingly, the present invention provides a length of plastic cable chain having two free ends, the chain comprising a plurality of metallic cables jacketed in plastics material and spaced apart by cross-linked spacer members, characterized in that each of the free ends of each of the cables has a respective eyelet for facilitating the coupling of the oppositely aligned free ends of the cables by means of a connecting link to define thereby a continuous substantially plastic cable chain.

In one embodiment at least one of the eyelets is formed by the free end of the cable being bent over and joined to another part of the cable to form a closed loop. In this embodiment, it is convenient for each of the eyelets to be formed by the free ends of the cables being bent over and each joined to their part of their respective cable.

In a preferred embodiment the cable is bent over so that two short linear sections of the free end of the cable lie in juxtaposition to one another and a join between a part of the sections is molded over with plastics material. In this embodiment the center of the eyelet may be offset relative to the center of the cable or may be arranged to be aligned with the center of the cable. The metallic cable is preferably braided stainless steel.

In a further aspect of the invention there is provided a method of manufacturing a length of plastic cable chain having two free ends, including forming a chain comprising a plurality of metallic cables jacketed in plastics material and spaced apart by cross-linked spacer members, the method being characterized by forming each of the free ends of the metallic cables with a respective eyelet for facilitating the coupling of the free ends of oppositely aligned cables by means of a connecting link to define thereby a continuous substantially plastic cable chain.

In a further aspect of the invention there is provided a method of coupling the ends of the chain defined above by means of a connecting link to make the chain continuous, the method comprising inserting a respective connecting pin through the plurality of eyelets defined at each end of the chain, connecting the pair of connecting pins together by a pair of link plates, and providing at least one locking member outwardly on at least one of the link plates.

BRIEF DESCRIPTION OF THE DRAWINGS

The present invention will be described further by way of examples with reference to the accompanying drawings in which.

DESCRIPTION OF THE PREFERRED EMBODIMENT

Figure 1:
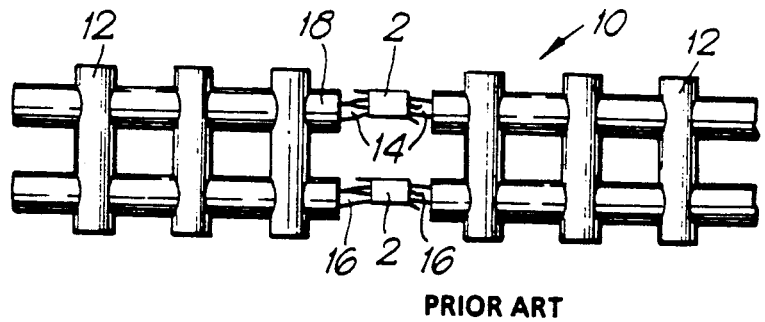
FIG. 1 is a plan view of a prior art cable chain and illustrates a known method of joining the ends of a cable chain.
Figure 2:
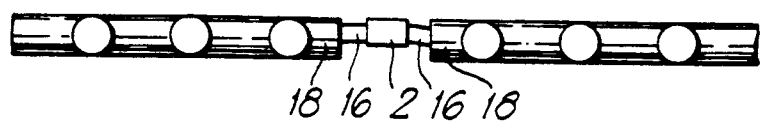
FIG. 2 is a side view of the cable chain of FIG. 1.
Figure 3:
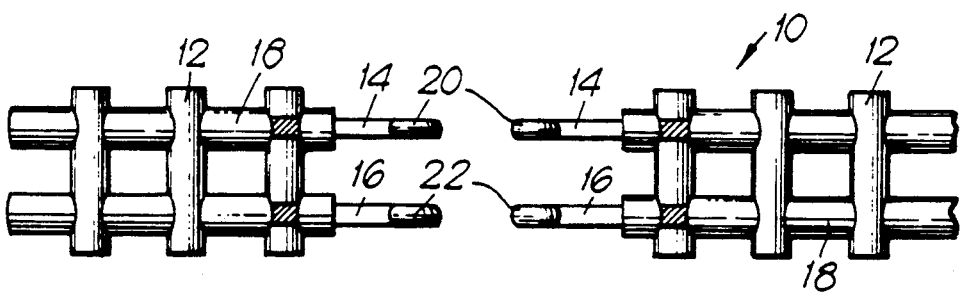
FIG. 3 is a plan view of the cable chain of the present invention and illustrates a design of cable chain according to one embodiment of the invention.
Figure 4:
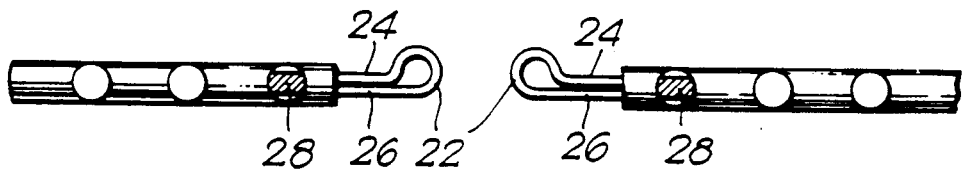
FIG. 4 is a side view of the cable chain of FIG. 3.
Figure 5:
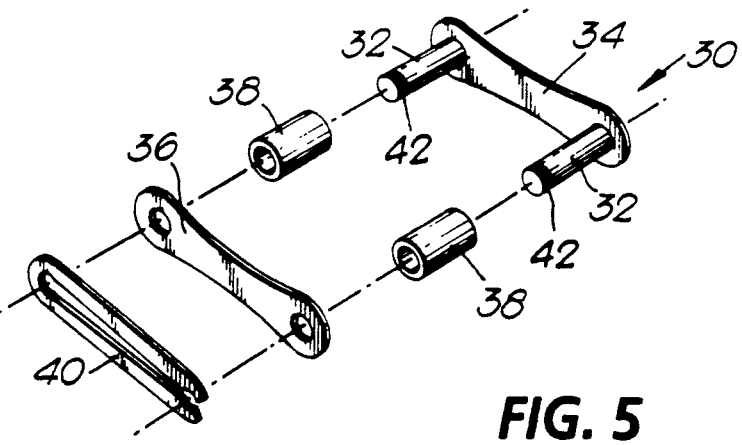
FIG. 5 illustrates an exploded view of a connecting link suitable for coupling together the cable ends shown on FIGS. 3 and 4.

FIG. 1 has been described above in relation to a known method of joining the ends of a plastic cable chain and for the purposes of the present description like features in FIGS. 1 and 2 have been designated by the same reference numerals.

Referring to FIG. 2 the end portions of a plastic cable chain 10, sometimes referred to as a plastic ladder chain, are shown. The chain 10 comprises a plurality of plastic cross-link members 12 integrally formed with a pair of braided stainless steel cables 14, 16 jacketed in plastics material 18. Each end of the cables 14, 16 is bent over on itself to form a closed loop or eyelet 20, 22. In the example shown, each end of the cable 14, 16 is bent over so that two short linear sections 24, 26 lie in juxtaposition and these sections are joined at a part or location 28 which is molded over within the plastics material 18. The cable join 28 can take a variety of forms but is conveniently formed during manufacture by a swaging technique.

A connecting link 30 is employed to connect the eyelets 20, 22 together so as to form a continuous substantially plastic cable chain. The connecting link 30 is in the form of a conventional chain link comprising a pair of metallic connecting pins 32, a pair of metallic link plates 34, 36 one of which, known as the connecting link plate and designated here by numeral 36, is snapped into annular grooves 42 provided on the connecting pins 32. Each of the connecting pins 32 carries a respective rotatable sleeve spacer, or roller, 38, and the assembly is locked together by a U-shaped metallic locking clip 40 which is also snapped into the annular grooves 42 formed in the connecting pins 32. The connecting pins 32 are integrally connected to the link plate 34.

In order to connect the ends of the cables, the pins 32 are first fed through the eyelets 20 after which the spacers 38 are slid onto the pins 32. The protruding ends of the pins 32 are then fed through the eyelets 22 and the link plate 36 snapped into position over the ends of the pins 32. The locking member 40 is then snapped into place. In this manner it can be seen that a service engineer can rapidly connect together the ends of the cables 14, 16 without the need for any special tools and with minimum risk of causing damage to the ends of the cables. It has also been found that the continuous substantially plastic cable chains formed in this manner are stronger and have a longer life than that of previous chains. Thus it has been found by testing that when the chains have been used as drive chains in copiers, in which the tension force is typically 25 newtons, the life of the chains have lasted much longer than chains formed like that of FIG. 1 and in at least one instance have lasted for the life of the machine.

While the invention has been described above with reference to the preferred embodiment thereof, it will be appreciated that various modifications in form and detail may be made therein without departing from the scope of the invention. For example, in the preferred embodiment described above the join 28 is created by a swaging technique whereas in alternative embodiments the join 28 may be created by a crimping or splicing technique. Likewise it will be appreciated that the shape of the eyelet and its cross-section can vary as the main requirement for the eyelet is that it defines a closed loop. In FIG. 2, for example, it will be noted that each eyelet is in the form of a ring and the center of the eyelets 20, 22 are shown offset from the center lines of the cables 14, 16. This arrangement is for manufacturing convenience as the eyelets will be pulled into line with the cables 14, 16 when the cables come under tension. In other embodiments the eyelets can be formed during manufacture by wrapping or splicing the strands of each cable around a metal eyelet. It will also be appreciated that the position of the join 28 can differ to that shown in FIG. 2 and that in other embodiments it may be advantageous to make more than one join in the region of the free end of each cable.

I claim:

1. A plastic cable chain having two opposing free ends, the chain comprising a plurality of metallic cables jacketed in a plastic material and spaced apart by cross-linked spacer members, each of the free ends of each of the cables having a respective eyelet for facilitating coupling between said free ends, the eyelets on the free ends of the cables being confrontingly aligned and coupled together by means of a connecting link to define thereby a continuous substantially plastic cable chain.

2. A plastic cable chain as claimed in claim 1, wherein at least one of the eyelets is formed by the free end of the cable being bent over and joined to another part of the cable to form a closed loop.

3. A plastic cable chain as claimed in claim 2, wherein each of the eyelets is formed by the free ends of the cables being bent over and each joined to their part of their respective cable.

4. A plastic cable chain as claimed in claim 3, wherein the center of the eyelet is offset relative to the center of the cable.

5. A plastic cable chain as claimed in claim 3, wherein the center of the eyelet is aligned with the center of the cable.

6. A plastic cable chain as claimed in claim 3, wherein the cable is bent over so that two short linear sections of the free end of the cable lie in juxtaposition to one another.

7. A plastic cable chain as claimed in claim 6, wherein the join between a part of the sections is molded over with plastics material.

8. A plastic cable chain as claimed in claim 7, wherein the join is formed by a swaging technique.

9. A plastic cable chain as claimed in claim 7, wherein the join is formed by a crimping technique.

10. A plastic cable chain as claimed in claim 7, wherein the join is formed by a splicing technique.

11. A plastic cable chain as claimed in claim 7, wherein the metallic cable is braided stainless steel.

12. A method of manufacturing a length of plastic cable chain having two opposing free ends, including forming a chain comprising at least two metallic cables jacketed in plastics material and spaced apart by cross-linked spacer members, the method comprising the steps of:
(a) forming each of the free ends of the metallic cables with a respective eyelet;
(b) aligning the eyelets of one free end with the eyelets of the other free end; and
(c) coupling the eyelets of the free ends of the cable chain by a connecting link to define thereby a continuous substantially plastic cable chain.

13. The method of claim 12, wherein the connecting link comprises a metallic plate with two parallel connecting pins extending therefrom and integral therewith, the distal ends of the connecting pins each having an annular groove; and wherein the method further comprises:
(d) inserting a respective one of the connecting pins through one of the eyelets on opposite free ends of the chain;
(e) installing a sleeve over each connecting pin and between the eyelets of each free end of the chain;
(f) continuing the insertion of the connecting pins through the other eyelet of the same cable chain end;
(g) connecting the pair of connecting pins together by installing a second link plate on the distal ends of the connecting pins which protrude from eyelets; and
(h) fastening at least one locking member outwardly of the second link plate and in the annular grooves in the distal ends of the connecting pins.

* * * * *